May 3, 1927.
J. J. SULLIVAN
1,627,258
HEDGE TRIMMER
Filed Oct. 16, 1926
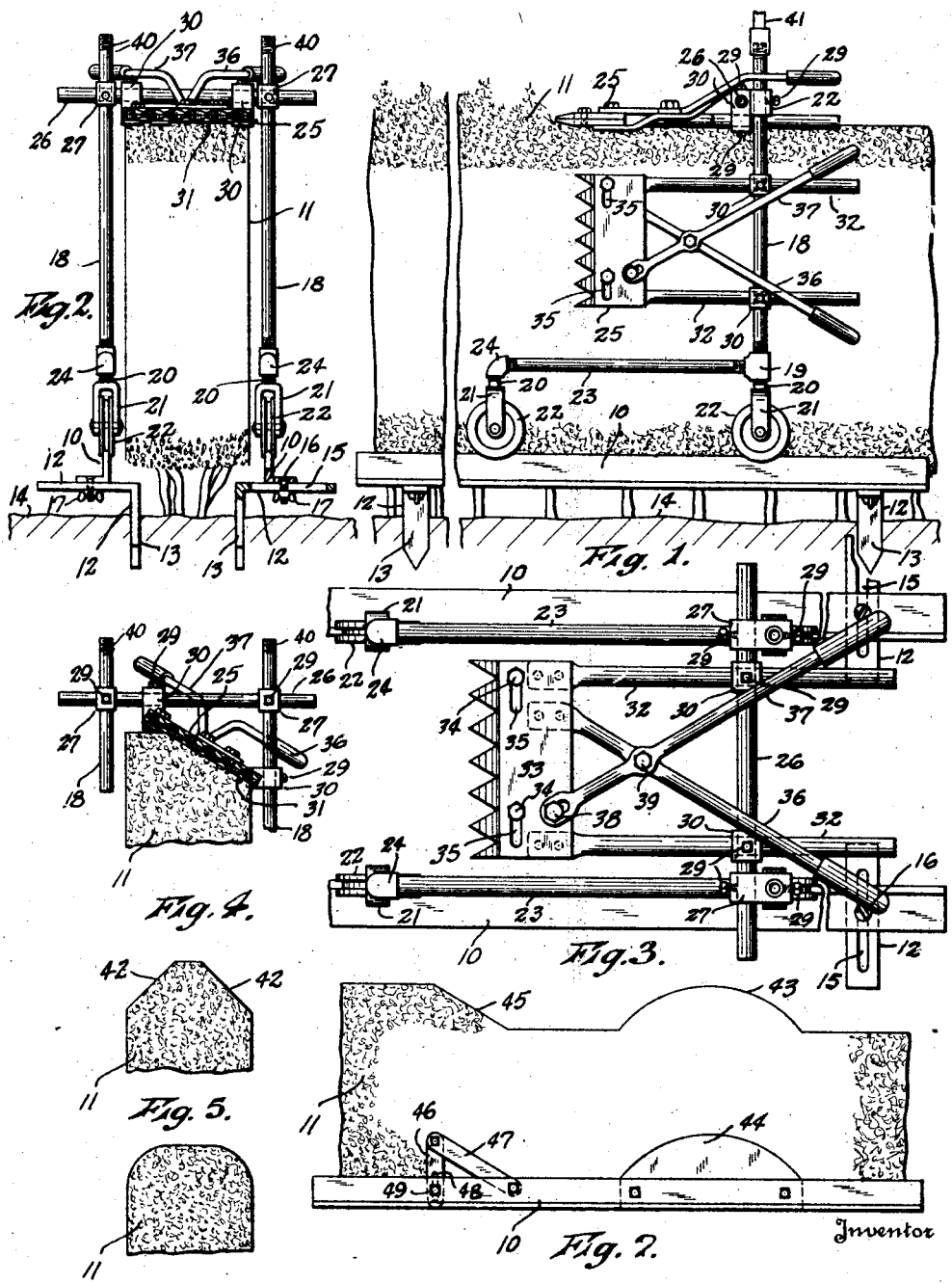
Inventor
John J. Sullivan
By Wooster & Davis
Attorneys Patented May 3, 1927.

1,627,258

UNITED STATES PATENT OFFICE.

JOHN J. SULLIVAN, OF BRIDGEPORT, CONNECTICUT.

HEDGE TRIMMER.

Application filed October 16, 1926. Serial No. 142,038.

This invention relates to hedge trimmers, and has for an object to provide a trimmer with which the hedge may be more easily and uniformly trimmed to the desired shape than with the trimmers now available.

It is also an object of the invention to provide a trimmer which may be easily and quickly adjusted to the proper position, and then after adjustment, to be easily operated to cut the hedge according to this adjustment.

It is a further object of the invention to provide a trimmer with which irregular shaped portions may be easily cut in a hedge to get different desired effects.

With the foregoing and other objects in view, I have devised a hedge trimmer, the preferred form of which is illustrated in the accompanying drawing forming a part of this specification. In this drawing, Fig. 1 is a side elevation of the trimmer showing its use on a hedge.

Fig. 2 is an end elevation thereof looking from the left of Fig. 1, but showing the side trimmer removed.

Fig. 3 is a top plan view thereof showing the side trimmer removed.

Fig. 4 is an end view of the upper portion of the trimmer and the top portion of a hedge showing how it may be used to trim an inclined surface on the hedge.

Figs. 5 and 6 are similar views showing the upper portions of hedges illustrating different effects which may be secured, and Fig. 7 is a side elevation of a hedge and the track showing the use of templates for cutting different effects on the top of the hedge.

My improved trimming device comprises supporting rails 10 extending longitudinally of the hedge 11, there being one on each side of the hedge. These rails may be of different shapes in cross section, but I prefer to use the simple angle irons I have illustrated. These rails are mounted on supports 12, the preferred construction being inverted L-shaped or angle members, as shown, having upright supporting portions 13 pointed at their lower ends so as to be easily driven into the ground 14. The horizontal portions of these supports are adapted to carry rails 10 which are adjustably mounted thereon so as to be movable toward and from the hedge. A convenient and simple means for adjustably mounting these rails on the supports is to provide the supports with elongated slots 15 and pass screws 16 through the horizontal portion of the rails and through these slots, and provide thumb nuts 17 for clamping the rails in adjusted position.

Mounted to run along these rails is a carriage for supporting the trimmer proper. This carriage is of a very simple construction comprising upright bars 18, which may be pieces of pipe of the desired length, threaded at their lower ends into a standard T 19, and which is threaded onto a stud 20 on a forked member 21 in which is mounted a wheel 22. There are two of these upright bars, one on each side of the hedge, and lateral support is provided by means of a bar 23, such as a section of pipe, threaded into the T 19 and connected by an elbow 24 with a second fork 21 mounted on another wheel 22. The length of the bar or pipe 23 may be made anything found desirable to properly counterbalance the weight of the clipper 25 mounted on the carriage. For an extremely high hedge the elbow 24 may be unscrewed from the pipe, another section of pipe screwed onto this pipe by means of the ordinary union and then the elbow with the supporting wheel applied to the free end of this section.

Extending transversely across and above the hedge is a bar 26, and this bar is adjustably secured to the uprights 18. A convenient means of securing this bar is by means of blocks 27 each having two openings therethrough extending at right angles to each other, one opening for the upright 18 and the other for the horizontal bar, and these blocks may be clamped to the bars by means of set screws 29. Similar blocks 30 are used to mount the clipper 25 on either the upright or horizontal bar, or the two together. These blocks are clamped in adjusted position by similar set screws 29. The clipper may be of any suitable type, but that shown comprises a stationary knife 31 mounted on rods 32 and a movable knife 33 secured to the stationary knife and adapted to be reciprocated longitudinally thereon. It may be held by any suitable guides such as screws 34 in elongated slots 35. There is also preferably a handle 36 secured to the stationary knife and another handle 37 pivoted to the movable knife, as shown at 38, and also pivoted to the handle 36, as shown at 39. The rods 32 carrying the clipper pass through openings in the blocks 30 and are secured in adjusted positions therein by set screws 29. The bars 18 may be threaded at their upper ends, as shown at 40, so that in trimming extra high hedges extensions 41 may be threaded on these supports to secure the desired height.

In operation the rails are properly positioned at the sides of the hedge by stretching strings and then setting the rails thereby. The height of the rails is determined by the amount to which the upright portions 13 of the supports 12 are driven into the ground, and the lateral position of the rails with respect to the hedge is adjusted by screws 16 in the slots 15, and the rails are then clamped in the adjusted position by the thumb nuts 17. In trimming the upright sides of the hedge the clipper is mounted on one of the upright bars 18, as shown in Fig. 1, and may be adjusted to the proper position both as to height and laterally with respect to the hedge by means of the set screws 29, and is then clamped by these screws in the proper adjusted position. The operator then grasps the handles on the levers 36 and 37 and by swinging the lever 37 will operate the clipper while at the same time the clipper may be moved along the sides of the hedge by moving the carriage along the rails. It will be apparent that during this movement the carriage will hold the clipper in proper relation to the hedge, and all the operator has to do to secure a straight uniform cut is to operate the clipper. Different cuts may be secured by raising and lowering the clipper on the upright. For trimming the top of the hedge the clipper is merely mounted on the transverse bar 26, as shown in Figs. 1, 2 and 3 and operated in the same manner. It will, of course, be understood that although I have shown two clippers in Fig. 1, only one of them will ordinarily be used at a time. In other words the same clipper will be used for clipping the sides and top of the hedge.

If it is desired to cut a beveled or inclined surface on one side of the hedge the clipper may be mounted in a block 30 carried on the transverse bar 26 and another block 30 carried on an upright bar 18, as shown in Fig. 4. The proper angle may be secured by merely adjusting these blocks along the bars. After the clipper is thus positioned a uniform bevel or inclined surface is cut the same way as described above for trimming the top or a side of the hedge. After one bevel has been cut a similar bevel may be cut on the other side, as indicated in Fig. 5, the bevels being indicated at 42. If it is desired to cut round upper edges on the hedge, as indicated in Fig. 6, this may be done by mounting the clipper in the manner shown in Fig. 4 but taking very small cuts and adjusting the angle of the clipper between each cut.

If it is desired to cut different shapes on the top of the hedge this may be done as illustrated in Fig. 7. For this purpose templates may be secured to the rails 10. If it is desired to make a curved portion 43 on the top of the hedge a similarly shaped template 44 may be attached to the rail, and as the rails of the carriage run over this template it will, of course, cause the clipper to take a similar path to clip the top of the hedge. If merely a straight incline is desired as indicated at 45, a correspondingly shaped template is used. This may be either an angle plate or, as shown in Fig. 7, this template may comprise an upright bar 46 pivoted to an inclined bar 47, and the upright having an elongated slot 48 for a securing screw 49. By adjusting the upright the angle of inclination will be adjusted as desired. In trimming over the top of a right angled corner of the hedge the clipper on the top bar may be extended in the opposite direction from that shown in Figs. 1, 2 and 3.

It will be apparent from the foregoing description that the device is very simple in construction and that there is universal adjustment for the clipper so that it may be mounted in any position desired for cutting the hedge, and that after once adjusted an even uniform cut may be made by merely operating the clipper as the carriage is moved along the rails. Furthermore, the device is easily set up and taken down, and therefore, it is not difficult to assemble or operate.

Having thus set forth the nature of my invention, what I claim is:

1. In a hedge trimming device, track rails to extend longitudinally on each side of the hedge, adjustable supports for said rails to permit proper location thereof, a carriage having wheels to run on said rails, upright supports on the carriage, a cross bar adjustably secured to the said upright supports, a clipper, and means for adjustably mounting the clipper on the upright supports and cross bar.

2. In a hedge trimming device, supporting rails to extend along the sides of the hedge, a carriage having wheels to run on said rails and including upright supports on opposite sides of the hedge, a transverse support adjustably secured to the upright supports, a clipper, and clipper supports adapted to be adjustably mounted on the upright and transverse supports.

3. In a hedge trimming device, a pair of rails to extend one on each side of the hedge, supports for said rails including an upright portion to be driven into the ground and a tranverse portion, means to adjustably secure the rails to the transverse portion to allow adjustment of the rails toward and from the hedge, a carriage having wheels to run on the rails, a clipper, and means for adjustably mounting the clipper on the carriage.

4. In a hedge trimming device, a pair of rails to extend one on each side of the hedge, supports for said rails comprising angle members having an upright portion to be driven into the ground and a horizontal portion to support the rails, means to adjustably secure the rails to said horizontal portion to permit longitudinal adjustment thereon, a carriage mounted on the rails and including supports extending upright at the sides of the hedge and transversely over the same, a clipper, and means for adjustably securing the clipper to said latter supports.

5. In a hedge trimming device, a wheeled carriage including spaced upright bars one on each side of the hedge, a bar extending transversely of the hedge and adjustably secured to the upright bars, blocks adjustably mounted on the bars, and a clipper carried by said blocks.

6. In a hedge trimming device, a wheeled carriage including spaced upright bars one on each side of the hedge, a bar extending transversely of the hedge and adjustably secured to the upright bars, blocks adjustably mounted on the bars, a clipper having supporting rods, means for adjustably mounting said rods in said blocks, and means for clamping the rods and blocks in adjusted positions.

7. In a hedge trimming device, a wheeled carriage including spaced upright bars on the opposite sides of the hedge having means at their upper ends for attachment of extensions for said bars, a transverse bar, means for adjustably securing the transverse bar to said upright bars, supporting blocks adjustably mounted on said bars, a clipper having supporting rods, and means for adjustably securing said rods in the blocks.

8. In a hedge trimming device, supporting rails to extend longitudinally of the hedge on opposite sides thereof, a wheeled carriage mounted to run on said rails, a trimmer mounted on said carriage, and templates secured to the rails to cooperate with the carriage to cause the trimmer to cut different shapes in portions of the hedge as the carriage is moved along the rails.

In testimony whereof I affix my signature.

JOHN J. SULLIVAN.